July 30, 1929.  V. E. NELSON  1,722,478
PACKING RING
Filed Aug. 31, 1928
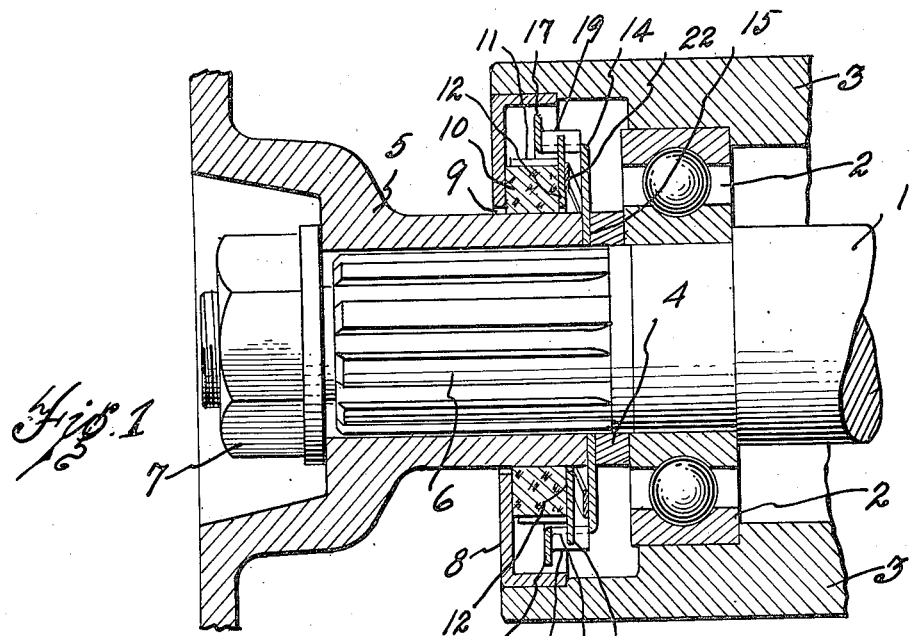
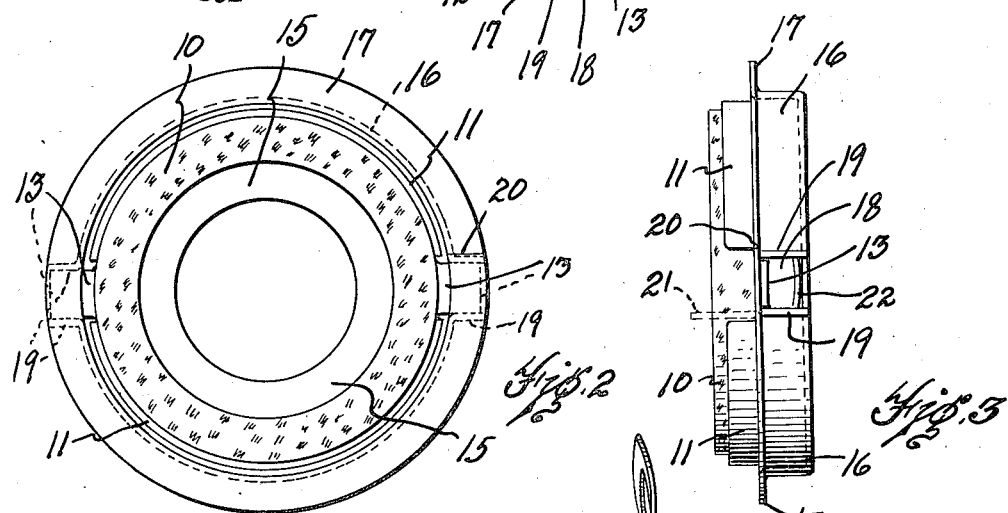
INVENTOR.
VICTOR E. NELSON
BY
ATTORNEY.

Patented July 30, 1929.

1,722,478

UNITED STATES PATENT OFFICE.

VICTOR E. NELSON, OF PONTIAC, MICHIGAN, ASSIGNOR TO UNIVERSAL OIL SEAL COMPANY, OF PONTIAC, MICHIGAN, A CORPORATION OF MICHIGAN.

PACKING RING.

Application filed August 31, 1928. Serial No. 303,151.

This invention relates to packing rings and the object of the invention is to provide a packing ring for preventing leakage along a shaft.

Another object of the invention is to provide a packing ring arranged for sealing two faces simultaneously to prevent oil leakage, the packing ring being held in position by means of a spring.

A further object of the invention is to provide a packing ring adapted to rotate with the shaft and arranged to pack a face extending at approximately a right angle to the axis of the shaft.

A further object of the invention is to provide a packing ring which will maintain an oil seal even though the shaft does not rotate truly on its axis.

Another object of the invention is to provide a packing ring which will pack a face which does not extend at an exact right angle to the axis of the shaft.

These objects and the several novel features of the invention are hereinafter more fully described and claimed and the preferred form of construction by which these objects are attained is shown in the accompanying drawings in which—

Fig. 1 is a section through a shaft and housing showing my improved packing ring as utilized therewith.

Fig. 2 is a face view of the packing ring.

Fig. 3 is an edge view thereof.

Fig. 4 is a detail in perspective of the retainer.

Fig. 5 is a similar detail of the packing ring cup.

Fig. 6 is an edge view of the spring positioned between the housing and the cup.

As shown in Fig. 1 a shaft 1 is provided which is rotatably mounted in the bearing 2 secured in the housing 3. A washer 4 is positioned around the shaft on the outside of the bearing and a wheel hub 5 is secured on the splined end 6 of the shaft 1 by the nut 7. The housing is provided with an end cap 8 which is secured in the housing as shown in Fig. 1 and prevents oil leakage between the housing and the cap 8. The cap 8 is provided with clearance at 9 for the wheel hub 5. Ordinarily any oil leakage passes through this space 9 between the wheel hub 5 and the cap 8 and for this reason a packing ring must be provided to prevent leakage through this space. The packing ring 10 is made of compressed cork, felt or other resilient material. This packing ring is positioned within a cup shaped member 11 shown in Figs. 1, 2, 3 and 5 and is preferably cemented in place in the cup. The edge of the cup 11 is of less depth than the packing ring, as shown in Figs. 1 and 3, and the flange 12 of this cup on which the packing ring seats is slightly less in diamater than the inner diameter of the packing ring and allows a slight clearance for the wheel hub 5 as shown in Fig. 1. A pair of diametrically opposite lugs 13 are struck out of the flange 11 of the cup and are coextensive with the flange 12. The retainer 14 is provided with a central flange 15 extending between the washer 4 and the wheel hub 5 and when the nut 7 is turned up this flange is bindingly held between the wheel hub 5 and the washer 4. The retainer 14, as shown in Figs. 3 and 4, is cup shaped in form and is provided with a cylindrical wall 16 terminating in an outwardly extending flange 17. This wall 16 is provided with apertures 18 on diametrically opposite sides and in forming these apertures 18 a pair of ears 19 are struck outwardly as shown in Figs. 1, 2, 3 and 4 which extend in parallel relation beneath the flange 17. The lugs 13 of the cup shaped member 11 are positioned in the apertures 18 between the ears 19 and in order to simplify the assembly the rim 17 on one side is split at 20 as shown in Fig. 2 and is upturned as shown by dotted lines 21 in the said Figure. An annular undulating spring 22, shown in Figs. 1 and 6, is then positioned in the bottom of the retainer 14 and one lug 13 is inserted into the aperture 18 on one side of the member 14 and the opposite lugs 13 is moved down to position between the ears 19, shown in Fig. 3, at which time the upturned portion 21 of the flange 17 is bent down to alignment with the remainder of the flange as shown in Fig. 3 thus partially compressing the spring 22 and providing a single assembled unit which is ready for use. As will be understood from Fig. 1 the member 11 is moved to the right of Fig. 1 when it is assembled in relation to the shaft thus compressing the spring 22 and placing a tension on the packing ring to pack the inner face of the cap 8. This tension tends to compress the resilient packing ring 10 and as it is prevented from expanding outwardly by the outer flange of the cup 11 the inner face of the resilient packing ring is forced into tight engagement with the hub 5. By this arrangement no leakage can take place between the packing ring and the hub and as the packing ring rotates with the hub and the shaft the inner face of the shaft 8 is constantly packed. Due to the resiliency of the spring 22 the cup shaped member 11 and packing ring may wobble during rotation of the shaft so that in cases where the cap 8 does not extend at a true right angle to the axis of the shaft 1 the packing ring will follow the inner face of the cap 8 and maintain contact therewith at all points throughout the face of the packing ring. The ears 19 act as guides for the lugs 13 and also provide a driving means for carrying the member 11 and packing ring with the retainer, shaft and wheel hub. While I have shown this packing ring as utilized with a shaft and wheel hub it may be used at any point where it is necessary to pack a shaft and prevent leakage between a rotating shaft and a stationary member.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. A packing ring for use between a rotatable member and a stationary housing having an end cap through which the rotatable member extends comprising a cup shaped retainer secured to rotate with the rotatable member and having a cylindrical wall terminating in an outwardly extending flange, the wall being provided with a pair of apertures on diametrically opposite sides to provide guide slots between the flange and bottom of the retainer, the metal displaced in forming the apertures being outturned to provide parallel extending ears on opposite sides of the guide slots, a cup shaped member having diametrically opposite lugs extending between the ears of the retainer, an annular undulating spring positioned between the cup shaped member and the bottom of the retainer, a resilient packing ring fitting closely about the rotatable member and secured in the cup shaped member, the face of the packing ring riding in contact with the end cap of the housing.

2. A packing ring for use between a rotatable member and a stationary housing having an end cap through which the rotatable member extends comprising a cup shaped retainer having a cylindrical wall terminating in an outwardly extending flange, the wall being apertured on diametrically opposite sides to provide guide slots, and the material displaced in forming the apertures being formed to provide ears extending outwardly on opposite sides of the guide slots, a cup shaped member having extending lugs riding in the guide slots between the said ears and between the flange and bottom of the retainer, a spring between the cup shaped member and the bottom of the retainer, and a resilient packing ring secured in the cup shaped member and closely fitting the rotatable member, the packing ring being forced into contact with the end cap of the housing by the spring.

3. In a packing ring, a housing, a shaft, a bearing for the shaft within the housing, a cap secured to the end of the housing and having a central aperture for the shaft of larger diameter than the shaft, a washer positioned about the shaft in contact with the bearing, a retainer, a wheel hub secured to the shaft, the retainer being engaged between the wheel hub and washer and being provided with apertures on diametrically opposite sides, a cup shaped member having lugs extending through the apertures of the retainer, a packing ring secured in the cup shaped member and fitting about the wheel hub, one face of the packing ring engaging the inner face of the apertured cap and an annular undulating spring positioned between the bottom of the recess and the cup shaped member.

4. A packing ring for use between a rotatable shaft and a stationary housing therefor comprising a cup shaped retainer secured to rotate with the shaft, the said retainer being provided with guide slots in the wall on diametrically opposite sides, the cup shaped member having diametrically opposite lugs engaging in the guide slots of the retainer, a resilient packing ring secured within the cup shaped member, a cap for the end of the housing against which the resilient packing ring is adapted to engage and an annular undulating spring positioned between the cup shaped member and the retainer and being adapted to be partially compressed by assembly of the device on the shaft.

5. A packing ring for use between a rotatable member and a stationary housing having an end cap through which the rotatable member extends comprising a cup shaped retainer secured to rotate with the rotatable member, the cup shaped retainer having a cylindrical wall terminating in an outwardly extending flange, the cylindrical wall being apertured on diametrically opposite sides between the flange and bottom of the retainer, a cup shaped member fitting about the rotatable member and having diametrically opposite extending lugs riding in the guide slots of the retainer, a resilient packing ring secured in the cup shaped member and fitting closely about the rotatable member and a spring between the cup shaped member and retainer forcing the packing ring into contact with the end cap of the housing.

6. A packing ring for use between a rotatable member and a stationary housing having an end cap through which the rotatable member extends comprising a cup shaped retainer secured to rotate with the rotatable member and having diametrically opposite guide slots, a cup shaped member having diametrically opposite extending lugs riding in the guide slots of the retainer, a spring between the cup shaped member and retainer tending to force the cup shaped member outwardly and a resilient packing ring secured in the cup shaped member and closely fitting the rotatable member and held in contact with the end cap of the housing by the spring.

In testimony whereof I sign this specification.

VICTOR E. NELSON.